Nov. 2, 1965

H. L. OLSON ET AL 3,215,063

ADJUSTABLE FRY PAN HANDLE

Filed March 7, 1963

INVENTORS.
HENRY L. OLSON
PHILIP E. WILLMAN
BY
Attorney

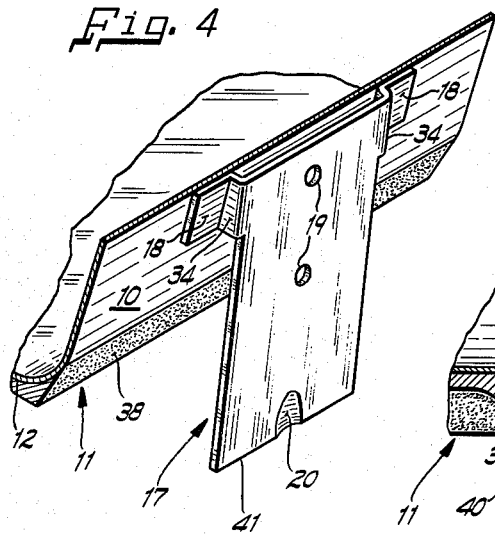
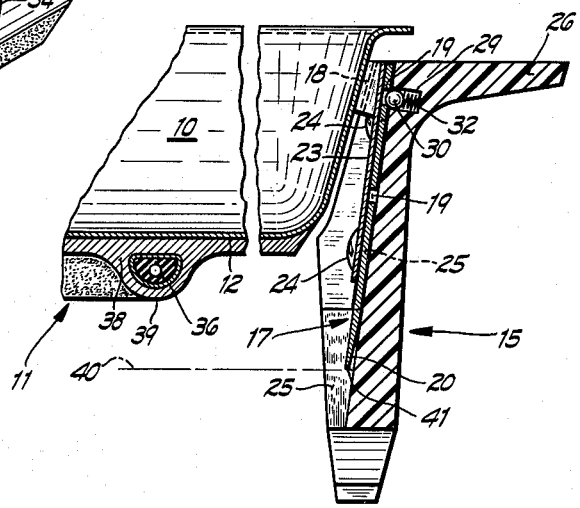
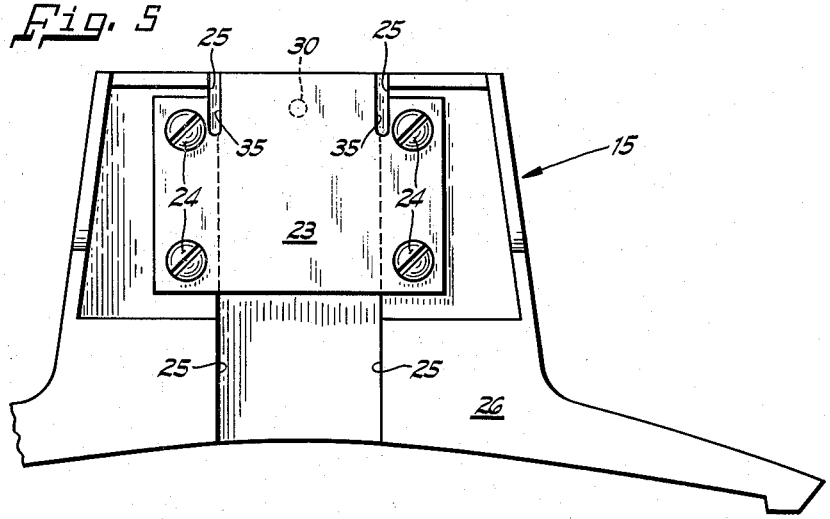

United States Patent Office 3,215,063
Patented Nov. 2, 1965

3,215,063
ADJUSTABLE FRY PAN HANDLE
Henry L. Olson, West Dundee, and Philip E. Willman, St. Charles, Ill., assignors to McGraw-Edison Company, Milwaukee, Wis., a corporation of Delaware
Filed Mar. 7, 1963, Ser. No. 263,560
4 Claims. (Cl. 99—425)

This invention relates to support means for cooking vessels and more particularly to an adjustable support for a food processing appliance such as an electric fry pan.

In addition to the desirability of removing attached parts such as handle, feet, etc., for easier cleaning, it is often desired to use an appliance in such a manner that the cooking surface is tilted or inclined so that fats rendered out of the food will drain off, for example as in frying bacon. Accordingly it is advantageous to have a means for supporting the appliance so that the cooking surface may be selectively adjusted to afford not only a horizontal attitude of elevated support, but one or more attitudes of inclination with respect to the surface upon which the appliance rests.

In the support structure of the present invention, the applicant has provided a device whereby, in the preferred embodiment, supporting leg structures may be readily assembled to or disassembled from the pan and each is provided with a plurality of selectively engageable securing positions to provide a plurality of elevations of either side effecting various attitudes of elevation and inclination of the cooking surface.

It is an object of this invention to provide an adjustable support for a cooking appliance that may be selectively adjusted to provide either a horizontal or an inclined attitude of the cooking surface.

It is also an object of this invention to provide a support for an electric fry pan that may be readily disassembled from the pan to afford greater cleanability.

These and other objects and advantages of this invention will become apparent from the following description when taken in connection with the accompanying drawings, wherein:

FIG. 4 is a fragmentary view of the fry pan showing the depending support portion attached to the pan;

FIG. 5 is a partial elevation of one supporting leg as viewed from the side confronting the pan; and FIG. 6 is a section view of the cooperating portions of the fry pan and supporting leg taken along line 6—6 of FIG. 3.

Figure 1:
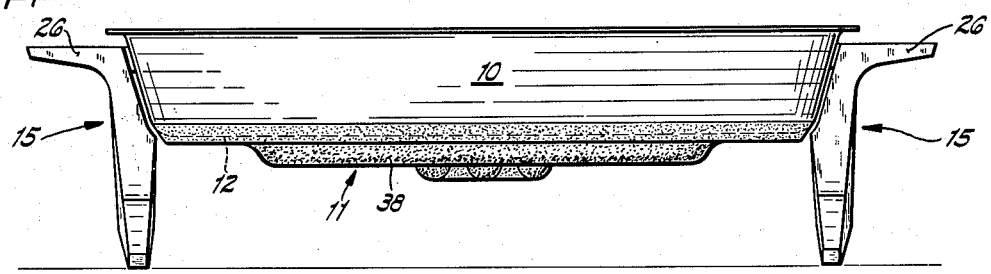
FIG. 1 is an elevation of the fry pan with supporting legs maintaining the pan in a horizontal attitude.
Figure 2:
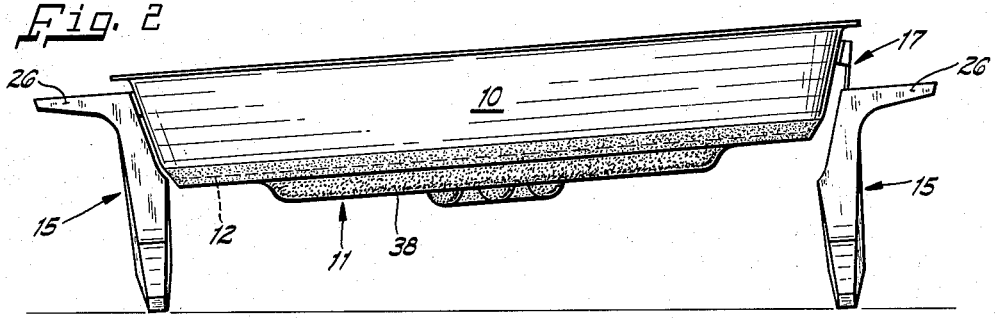
FIG. 2 is an elevation of the fry pan of FIG. 1 with one support extended to place the pan in an inclined attitude.
Figure 3:
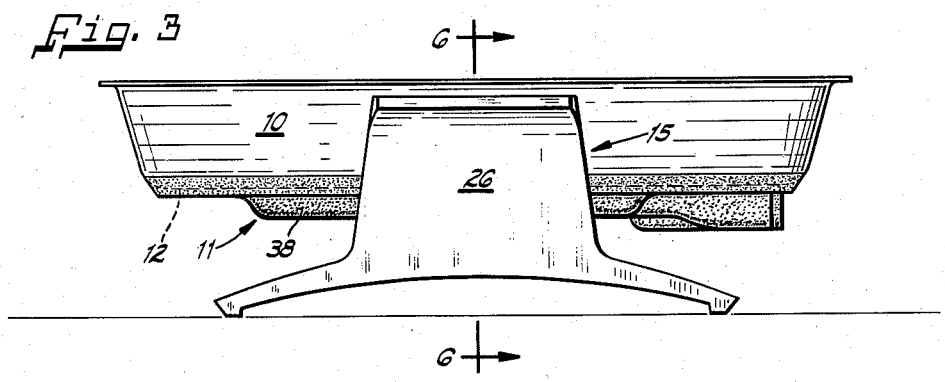
FIG. 3 is an elevation of the fry pan of FIG. 1 showing the outwardly facing longitudinal side of the supporting leg.

Referring to FIGS. 3 through 6, a stainless steel fry pan 10 with a heating element assembly 11, cast on the bottom surface 12, is supported by a pair of legs 15 (both of which are visible in FIGS. 1 and 2).

At opposite sides of the pan 10, plate-like members 17 are secured by welding transversely extending turned end portions 18 to the stainless steel side wall surface of the pan. The plate member 17 has a plurality of openings 19 and a centrally located wedge shaped surface 20 formed at the lower edge of the plate in alignment, along the plate surface, with the openings 19. The surface 20 tapers toward the surface of the plate 17 confronting the pan and serves to afford greater ease of assembly of the plate to the leg 15 as described hereafter.

Mounted on the handle 15, on the side thereof confronting the pan 10, is a plate 23 which is secured by the screws 24. The plate 23 overlies a depression or recess 25 in the plastic body 26 of the leg to form a guideway of rectangular cross section only slightly larger than the cross sectional dimensions of the depending portion of the plate member 17 so that such depending plate member portion may be received in closely confined reciprocable relation with the guideway. A cylindrical recess 29 is formed in the body portion 26, and disposed in this recess is a ball 30 which is biased toward the plate 23 by the compression spring 32.

The openings 19 form a plurality of detents and the spring biased ball 30 forms a detent engaging means whereby the leg 15 may be assembled to the pan 10 in various positions relative thereto by inserting the depending portion of the plate 17 into the guideway established by the plate 23 and the support body 26. The reduced plate thickness afforded by the inclined surface portion 20 allows the plate 17 to readily displace the ball 30 against the force of the spring 32 as the plate is inserted in the guideway and urged downward. The ball 30 lodges in the first of the openings 19 that is encountered to secure the handle in supporting relation to the pan, but by further downward pressure the ball is displaced and the plate 17 moved further within the guideway to the next position of cooperating engagement between ball 30 and an opening 19. The ball 30 has a diameter relating to the spacing between the width of the guideway to allow approximately a 40% projection of the diameter of the ball from the loosely confining cylindrical recess when the leg 15 is disassembled from the pan 10. The opening 19 is of slightly smaller diameter than the ball 30 to provide a firm engagement between the plate 17 and the ball 30 in the assembled condition. The spring constant of spring 32 is chosen as a balance between adequate supporting engagement between leg 15 and the pan 10 and ease of adjustment when it is necessary to overpower the spring to effect relative movement between detent positions. Further supporting cooperation between the pan 10 and leg 15 is afforded in the most often utilized position of elevated horizontal support wherein the plate 17 extends furthest into the guideway and the web sections 34 of the plate 17 are disposed in the slots 35 of plate 23.

The cooperating structures of both legs 15 are identical so that both legs can be removed from the pan for cleaning purposes and each of the legs can be selectively assembled to the pan to dispose the pan horizontally as shown in FIG. 1, inclined to one side as shown in FIG. 2, or inclined to the opposite side by changing the respective positions of each leg relative to the pan.

As seen in FIG. 6 secured to the bottom of the pan is a heating element assembly 11 which has a heating element 36 embedded within the raised portion of the cast aluminum material 38 and forms an integral part of the lower pan structure. Since the legs 15 can be completely removed from supporting relation with respect to the pan 10, to assure safe operating conditions under any foreseeable condition, the plate members 17 act not only as attaching and guiding members, but also are capable of providing support for the pan 10 and extend downwardly a sufficient distance to afford adequate clearance between the lowermost heated surface 39 and the surface 40 upon which the appliance rests with the legs 15 removed, should the pan be inadvertently connected or used with one or both of the legs removed. To accomplish this each plate member 17 presents a lower edge 41 which affords supporting engagement with the surface 40 at either side of the transverse axis of the pan 10.

Although but one embodiment has been shown and described, it will be apparent that various modifications

What is claimed is:

1. In combination with a vessel to be supported, support structure comprising a depending plate member secured by an upper portion to said vessel with a downwardly depending portion having parallel edge surfaces and detents formed therein; a support leg having a body portion with a generally vertical recess formed therein including transverse parallel sides and a plate overlying said vertical recess to form a guideway with an open upper end adapted to receive said plate member downwardly depending portion therein; a cylindrical recess in said support leg body portion opening axially into said vertical recess and confronting said overlying plate; a spring biased ball having a radius greater than the depth of said vertical recess disposed in said cylindrical recess and biased toward said overlying plate, said cylindrical recess being disposed to cause said spring biased ball to be selectively engageable with said depending plate member detents.

2. In combination with a vessel to be supported, a support structure comprising an attachment plate member having a generally rectangular substantially vertically extending portion with parallel transverse edge surfaces, horizontally displaced flanged portions secured to said vessel and web portions interconnecting said flanged portions to said vertically extending portions; a support leg having a body portion with a recess formed therein and an overlying plate secured over said recess to form an open end guideway for slidably receiving and horizontally confining said plate member vertically extending portion, said overlying plate having a pair of slots wherein said web portions of said attachment plate member are received when said attachment plate is at its location of maximum insertion into said guideway; detent means formed in said attachment plate vertically extending portion and detent engaging means carried by said support leg in confronting relation to said guideway and aligned to engage said attachment plate detent means when said attachment plate is inserted a predetermined distance into said guideway, said detent engaging means being spring biased towards said guideway and displaceable away from engagement with said detent means by a force exerted along the path of sliding movement of said attachment plate in said guideway.

3. In combination with a vessel to be maintained in an elevated position, a support structure comprising a pair of plate members each rigidly secured to said vessel by an upper portion respectively at opposite transverse sides of the vertical axis of said vessel and each having a downwardly depending portion with the lowermost distal edge portions thereof defining a surface in vertically spaced underlying relation to the lowermost projection of said vessel and generally parallel to the bottom of said vessel; a pair of support legs each having an open ended generally vertical guideway formed therein generally vertically slidably receiving one of said plate members in horizontally confining relation; detent means carried by each of said support legs projecting into and biased towards said guideway and aligned to engage said detent means at a predetermined position, said detent engaging means presenting an inclined surface within said guideway in the direction of plate member sliding movement whereby said detent engaging means may be selectively engaged and disengaged with said detent means by application of a force in said direction of plate member sliding movement.

4. In combination with a food processing vessel, a support structure comprising a pair of attaching members secured to opposite sides of said vessel having a generally rectangular downwardly depending plate portion, each respectively presenting a plurality of detents formed therein, said depending portion presenting lowermost edge surface portions disposed below the lowermost projection of said vessel and defining a plane generally parallel to the bottom of said vessel; a pair of selectively engageable support members each presenting a vertical guideway for a respectively slidably receiving said pair of attaching member depending portions and spring biased detent engaging means respectively carried by each of said support members in confronting relation to said guideway with each respectively aligned for selective engagement with one of said attaching member detents.

References Cited by the Examiner

UNITED STATES PATENTS

| | | | |
|---|---|---|---|
| 2,333,175 | 11/43 | Henley | 99—420 |
| 2,477,546 | 7/49 | Reeves | 99—446 |
| 2,514,910 | 7/50 | Strong | 248—151 |
| 2,724,571 | 11/55 | Friedman et al. | 248—151 |
| 2,931,612 | 4/60 | Graber | 248—295 |
| 3,086,448 | 4/63 | Forman | 99—425 |

FOREIGN PATENTS

| | | |
|---|---|---|
| 655,504 | 7/51 | Great Britain. |
| 787,413 | 12/57 | Great Britain. |

ROBERT E. PULFREY, *Primary Examiner.*

LAWRENCE CHARLES, EUGENE R. CAPOZIO,
*Examiners.*